US012639773B2

(12) United States Patent
Kawamoto et al.

(10) Patent No.: US 12,639,773 B2
(45) Date of Patent: May 26, 2026

(54) CONSTRUCTION MANAGEMENT SYSTEM, DATA PROCESSING DEVICE, AND CONSTRUCTION MANAGEMENT METHOD

(71) Applicant: Komatsu Ltd., Tokyo (JP)

(72) Inventors: Shun Kawamoto, Tokyo (JP); Tsubasa Hasumi, Tokyo (JP); Li Dong, Tokyo (JP)

(73) Assignee: KOMATSU LTD., Tokyo (JP)

( * ) Notice: Subject to any disclaimer, the term of this patent is extended or adjusted under 35 U.S.C. 154(b) by 256 days.

(21) Appl. No.: 18/279,075

(22) PCT Filed: Feb. 22, 2022

(86) PCT No.: PCT/JP2022/007262
§ 371 (c)(1),
(2) Date: Aug. 28, 2023

(87) PCT Pub. No.: WO2022/209434
PCT Pub. Date: Oct. 6, 2022

(65) Prior Publication Data
US 2024/0127372 A1      Apr. 18, 2024

(30) Foreign Application Priority Data
Mar. 31, 2021      (JP) ................................. 2021-061692

(51) Int. Cl.
*G06Q 50/08* (2012.01)
*G06T 17/00* (2006.01)
*G06V 20/17* (2022.01)
(52) U.S. Cl.
CPC ............. *G06Q 50/08* (2013.01); *G06T 17/00* (2013.01); *G06V 20/17* (2022.01)

(58) Field of Classification Search
CPC ......... G06Q 50/08; G06V 20/17; G06T 17/00
See application file for complete search history.

(56) References Cited

U.S. PATENT DOCUMENTS

2008/0180523 A1*  7/2008  Stratton ................. G09B 9/048
                                                                    348/114
2015/0228185 A1*  8/2015  Beckmann ............. G08C 17/02
                                                                    340/12.54

(Continued)

FOREIGN PATENT DOCUMENTS

CA          3129586 A1      10/2020
EP          3605257 A1      2/2020

(Continued)

OTHER PUBLICATIONS

Lee J, Kim B, Sun D, Han C, Ahn Y. Development of Unmanned Excavator Vehicle System for Performing Dangerous Construction Work. Sensors (Basel). Nov. 7, 2019. pp. 1-17. (Year: 2019).*

(Continued)

*Primary Examiner* — Jeff Zimmerman
*Assistant Examiner* — Hunter Molnar
(74) *Attorney, Agent, or Firm* — Troutman Pepper Locke LLP

(57) ABSTRACT

A construction management system includes an output unit that causes a display device to display a remotely operable work machine, a selection data acquisition unit that acquires machine selection data indicating specification of the work machine, and a remote operation permission unit that permits start of a remote operation of the work machine based on the machine selection data.

14 Claims, 9 Drawing Sheets

(56)     References Cited

U.S. PATENT DOCUMENTS

| | | | |
|---|---|---|---|
| 2016/0348504 A1* | 12/2016 | Hanski .................... | E21B 7/022 |
| 2017/0016211 A1* | 1/2017 | Arimatsu ................ | G01S 19/14 |
| 2017/0328030 A1* | 11/2017 | Yamada ................. | E02F 9/205 |
| 2018/0024549 A1 | 1/2018 | Hurd | |
| 2018/0051446 A1 | 2/2018 | Yoshinada et al. | |
| 2020/0071912 A1* | 3/2020 | Kennedy ............... | G06T 19/006 |
| 2020/0277757 A1* | 9/2020 | Kurokami ................ | E02F 9/24 |
| 2020/0356088 A1 | 11/2020 | Schlacks, IV et al. | |
| 2021/0108499 A1* | 4/2021 | Aarsland ................ | E21B 44/00 |
| 2022/0307224 A1* | 9/2022 | Hirose ................... | E02F 9/264 |

FOREIGN PATENT DOCUMENTS

| | | | |
|---|---|---|---|
| JP | H10-88624 A | | 4/1998 |
| JP | 2016-160741 A | | 9/2016 |
| JP | 6373728 B2 | * | 8/2018 |
| JP | 2020-180451 A | | 11/2020 |
| WO | 2020174774 A1 | | 9/2020 |
| WO | 2021019951 A1 | | 2/2021 |

OTHER PUBLICATIONS

Office Action mailed May 13, 2024, issued in the corresponding
Australian patent application No. 2022247649.

* cited by examiner

FIG.6

[CURRENT TERRAIN]

<CONSTRUCTION AREA>

52

CONSTRUCTION MANAGEMENT SYSTEM, DATA PROCESSING DEVICE, AND CONSTRUCTION MANAGEMENT METHOD

FIELD

The present disclosure relates to a construction management system, a data processing device, and a construction management method.

BACKGROUND

In a technical field related to construction management systems, there is known a remote operation system as disclosed in Patent Literature 1.

CITATION LIST

Patent Literature

Patent Literature 1: JP 2016-160741 A

SUMMARY

Technical Problem

When a plurality of work machines is on a construction site, it may be possible to suppress a reduction in construction efficiency on the construction site, if a work machine to be remotely operated can be appropriately selected according to the situation of the construction site.

An object of the present disclosure is to suppress a reduction in construction efficiency on a construction site.

Solution to Problem

According to an aspect of the present invention, a construction management system comprises: an output unit that causes a display device to display a remotely operable work machine; a selection data acquisition unit that acquires machine selection data indicating specification of the work machine; and a remote operation permission unit that permits start of a remote operation of the work machine based on the machine selection data.

Advantageous Effects of Invention

According to the present disclosure, it is possible to suppress a reduction in construction efficiency on the construction site.

BRIEF DESCRIPTION OF DRAWINGS

FIG. 6 is a diagram illustrating current terrain data according to an embodiment.

DESCRIPTION OF EMBODIMENTS

Embodiments according to the present disclosure will be described below with reference to the drawings, but the present disclosure is not limited to the embodiments. The component elements of the embodiments described below is configured to be appropriately combined with each other. Furthermore, some of the component elements may not be used.

[Construction Management System]

Figure 1:
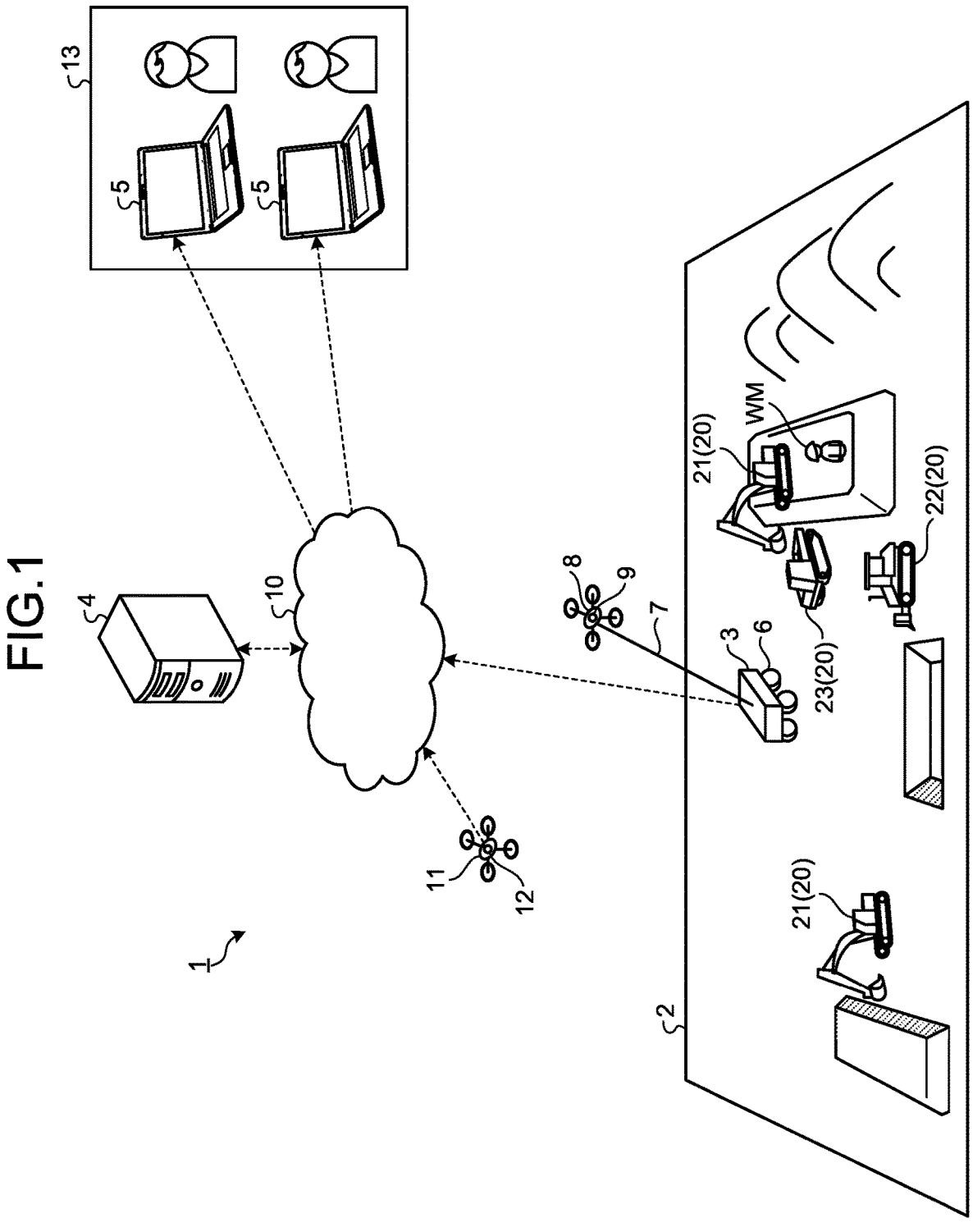
FIG. 1 is a schematic diagram illustrating a construction management system according to an embodiment.

FIG. 1 is a schematic diagram illustrating a construction management system 1 according to an embodiment. The construction management system 1 manages construction on a construction site 2. A plurality of work machines 20 operates on the construction site 2. In the embodiment, the work machines 20 include an excavator 21, a bulldozer 22, and a crawler carrier 23. Note that the work machines 20 may include a wheel loader. In addition, a person WM is on the construction site 2. An example of the person WM includes a worker who works on the construction site 2. Note that the person WM may be a supervisor who manages the construction. The person WM may be a visitor.

As illustrated in FIG. 1, the construction management system 1 includes a management device 3, a server 4, information terminals 5, a detection device 9, and a detection device 12.

The management device 3 includes a computer system arranged on the construction site 2. The management device 3 is supported by a carrier 6. The management device 3 is configured to travel on the construction site 2 by using the carrier 6. Examples of the carrier 6 include an aerial work vehicle, a truck, and a mobile robot. The server 4 is a data processing device including a computer system. The server 4 may be arranged on the construction site 2 or may be arranged at a remote place from the construction site 2. Each of the information terminal 5 is a computer system arranged at a remote place 13 from the construction site 2. An example of the information terminal 5 includes a personal computer or smartphone. The management device 3, the server 4, and the information terminal 5 communicate with each other via a communication system 10. Examples of the communication system 10 include the Internet, a local area network (LAN), a mobile phone communication network, and a satellite communication network.

The detection device 9 detects the construction site 2. The detection device 9 acquires three-dimensional data of the construction site 2. Examples of a detection target to be detected by the detection device 9 include the terrain of the construction site 2 and an object being on the construction site 2. The object includes one or both of a movable body and a stationary body. Examples of the movable body include each of the work machines 20 and the person WM. Examples of the stationary body include lumbers or construction materials.

The three-dimensional data acquired by the detection device 9 includes image data of the construction site 2. The image data acquired by the detection device 9 may be moving image data or still image data. An example of the detection device 9 includes a stereo camera. Note that the detection device 9 may include a monocular camera and a three-dimensional measurement device. An example of the three-dimensional measurement device includes a laser sensor (light detection and ranging: LIDAR) that detects the detection target by emitting a laser beam. Note that the three-dimensional measurement device may be an infrared sensor that detects the object by emitting infrared light, or a radar sensor (radio detection and ranging: RADAR) that detects the object by emitting a radio wave.

The detection device 9 is mounted on a flight vehicle 8. An example of the flight vehicle 8 includes an unmanned aerial vehicle (UAV) such as a drone. The detection device 9 detects the construction site 2 from above the construction site 2.

In the embodiment, the flight vehicle 8 and the management device 3 are connected by a cable 7. Detection data from the detection device 9 is transmitted to the management device 3 via the cable 7. The detection data from the detection device 9 transmitted to the management device 3 is transmitted to the server 4 via the communication system 10.

In the embodiment, the management device 3 includes a power supply or a power generator. The management device 3 is configured to supply power to the flight vehicle 8 via the cable 7.

The detection device 12 detects the construction site 2. Similarly to the detection device 9, the detection device 12 acquires the three-dimensional data of the construction site 2. The three-dimensional data acquired by the detection device 12 includes the image data of the construction site 2.

The detection device 12 is mounted on a flight vehicle 11. The detection device 12 detects the construction site 2 from above the construction site 2. No cable is connected to the flight vehicle 11. Detection data from the detection device 12 is transmitted to the server 4 via the communication system 10.

The flight vehicle 11 is configured to fly above the flight vehicle 8. The flight vehicle 11 is configured to fly over a wider range than the flight vehicle 8. The detection device 12 is configured to detect a wider range of the construction site 2 than the detection device 9. In the embodiment, the detection device 12 detects the whole of the construction site 2. The detection device 9 detects part of the construction site 2.

[Work Machine]

Figure 2:
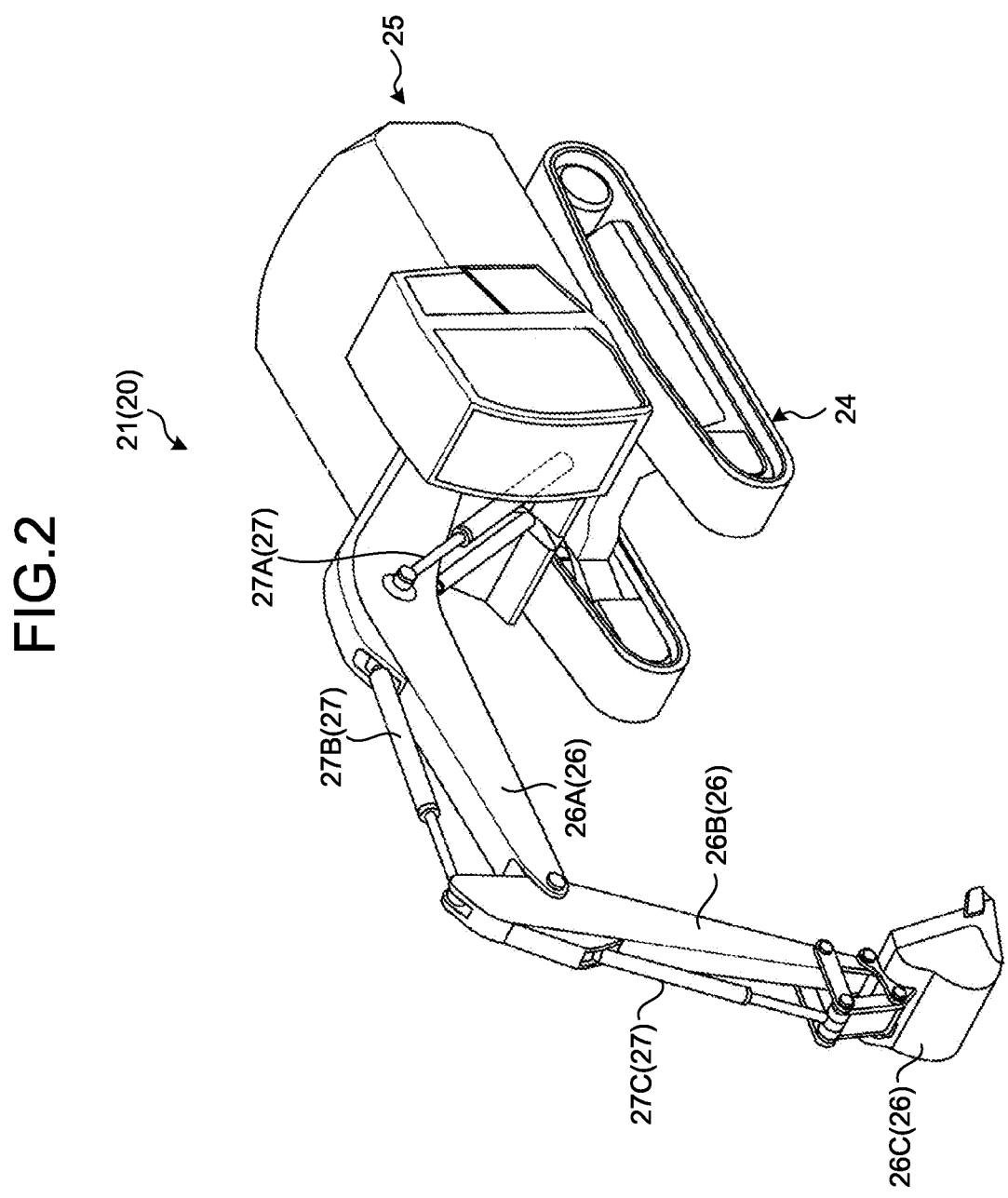
FIG. 2 is a perspective view of an excavator according to an embodiment.

FIG. 2 is a perspective view of the excavator 21 according to an embodiment. As illustrated in FIG. 2, the excavator 21 includes a carriage 24, a swing body 25 that is supported by the carriage 24, working equipment 26 that is supported by the swing body 25, and hydraulic cylinders 27 that drive the working equipment 26.

The carriage 24 has a pair of crawler tracks. The excavator 21 is configured to travel on the construction site 2 by using the carriage 24. The swing body 25 swings while being supported by the carriage 24. The working equipment 26 includes a boom 26A that is connected to the swing body 25, an arm 26B that is connected to the boom 26A, and a bucket 26C that is connected to the arm 26B. The hydraulic cylinder 27 includes a boom cylinder 27A that operates the boom 26A, an arm cylinder 27B that operates the arm 26B, and a bucket cylinder 27C that operates the bucket 26C.

The excavator 21 makes movements. Examples of the movements of the excavator 21 include a traveling movement of the carriage 24, a turning movement of the swing body 25, rising and lowering movements of the boom 26A, excavation and dumping movements of the arm 26B, and excavation and dumping movements of the bucket 26C.

Figure 3:
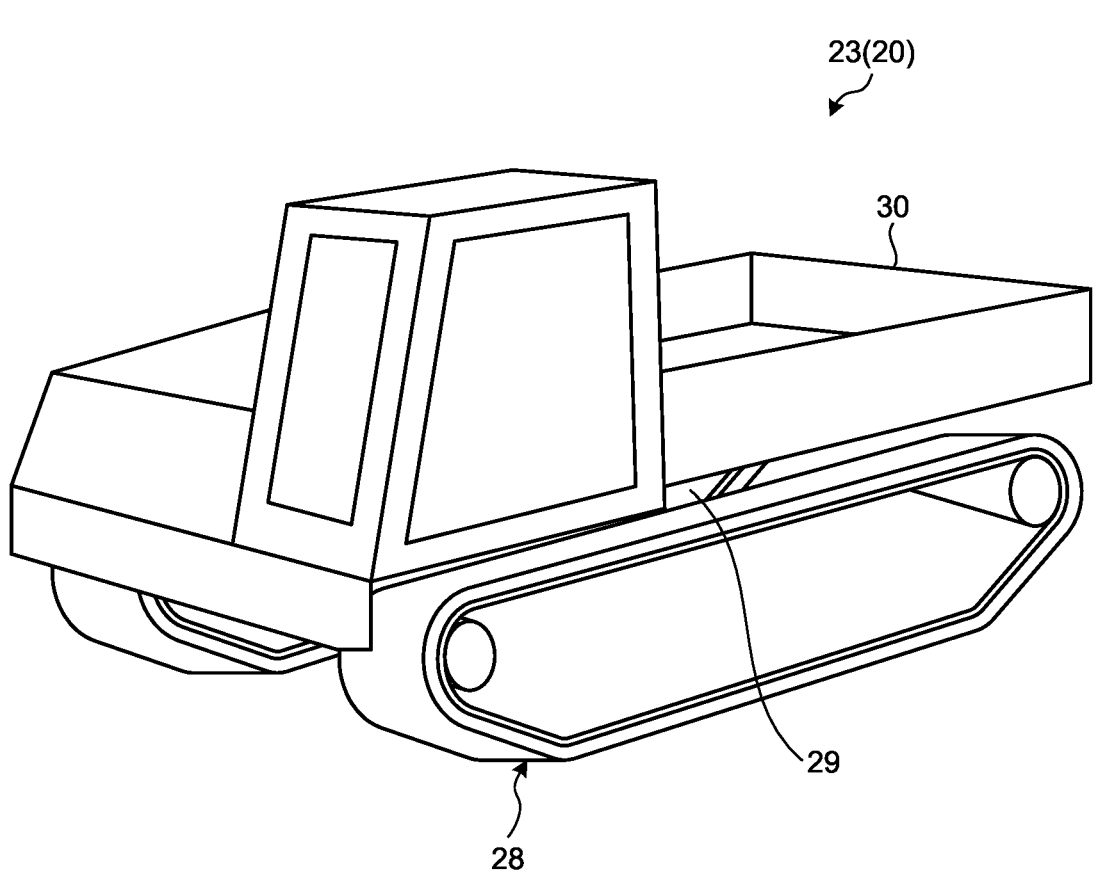
FIG. 3 is a perspective view illustrating a crawler carrier according to an embodiment.

FIG. 3 is a perspective view illustrating a crawler carrier 23 according to an embodiment. As illustrated in FIG. 3, the crawler carrier 23 includes a carriage 28, a vehicle body 29, and a dump body 30.

The carriage 28 has a pair of crawler tracks. The crawler carrier 23 is configured to travel on the construction site 2 by using the carriage 28. The dump body 30 is a member to be loaded. The excavator 21 is configured to load the dump body 30 by using the working equipment 26. The dump body 30 is configured to rise by a hoist cylinder which is not illustrated to discharge the load.

The crawler carrier 23 makes movements. Examples of the movements of the crawler carrier 23 include a traveling movement of the carriage 28 and lowering and dumping movements of the dump body 30.

[Server]

Figure 4:
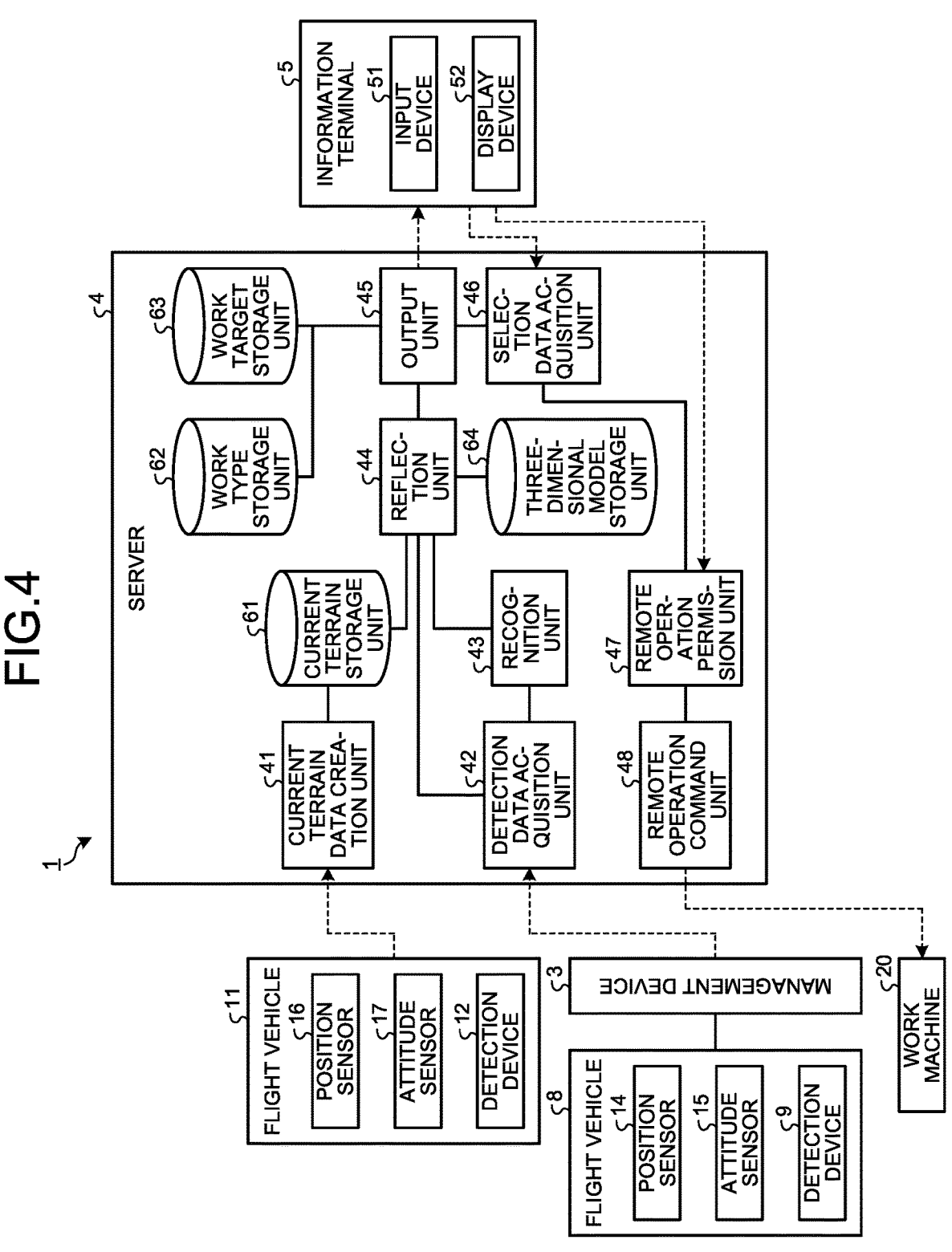
FIG. 4 is a functional block diagram illustrating the construction management system according to the embodiment.

FIG. 4 is a functional block diagram illustrating the construction management system 1 according to an embodiment. As illustrated in FIG. 4, the construction management system 1 includes the flight vehicle 8, the flight vehicle 11, the management device 3 that is arranged on the construction site 2, the server 4, and the information terminal 5 that is arranged at the remote place 13 from the construction site 2.

The flight vehicle 8 includes a position sensor 14, an attitude sensor 15, and the detection device 9.

The position sensor 14 detects the position of the flight vehicle 8. The position sensor 14 detects the position of the flight vehicle 8 by using a global navigation satellite system (GNSS). The position sensor 14 includes a GNSS receiver (GNSS sensor), and detects the position of the flight vehicle 8 in a global coordinate system. The attitude sensor 15 detects an attitude of the flight vehicle 8. An example of the attitude sensor 15 includes an inertial measurement unit (IMU).

The flight vehicle 11 includes a position sensor 16, an attitude sensor 17, and the detection device 12.

The position sensor 16 includes a GNSS receiver and detects the position of the flight vehicle 11 in the global coordinate system. The attitude sensor 17 detects an attitude of the flight vehicle 11. An example of the attitude sensor 17 includes an inertial measurement unit (IMU).

The information terminal 5 includes an input device 51 and a display device 52.

The input device 51 is operated by an administrator being at the remote place 13. The input device 51 generates input data on the basis of the operation of the administrator. An example of the input device 51 includes a touch screen, a computer keyboard, a mouse, or an operation button. Note that the input device 51 may be a non-contact input device including an optical sensor, or may be a voice input device.

The display device 52 displays display data. The administrator at the remote place 13 is allowed to confirm the display data displayed on the display device 52. An example of the display device 52 includes a flat panel display such as a liquid crystal display (LCD) or an organic electroluminescence display (OELD).

The server 4 includes a current terrain data creation unit 41, a detection data acquisition unit 42, a recognition unit 43, a reflection unit 44, an output unit 45, a selection data acquisition unit 46, a remote operation permission unit 47, a remote operation command unit 48, a current terrain storage unit 61, a work type storage unit 62, a work target storage unit 63, and a three-dimensional model storage unit 64.

The current terrain data creation unit 41 creates current terrain data that indicates a current terrain of the construction site 2 on which the work machines 20 perform operations. The current terrain data is three-dimensional terrain data that indicates the current terrain of the construction site 2. The current terrain includes a reference terrain before predetermined construction is started.

The current terrain data creation unit 41 creates the current terrain data on the basis of the detection data from the detection device 12. As described above, the detection device 12 detects the whole of the construction site 2. The current terrain data indicates the current terrain of the whole of the construction site 2.

In the embodiment, the detection device 12 detects the construction site 2 at a first frequency. For example, the detection device 12 detects the construction site 2 only once before starting the work of the day. The detection device 12 detects the current terrain indicating the reference terrain before predetermined construction is started on the construction site 2. The current terrain data creation unit 41 creates the current terrain data at the first frequency. The current terrain data created by the current terrain data creation unit 41 is stored in the current terrain storage unit 61. The current terrain data stored in the current terrain storage unit 61 is updated at the first frequency.

Note that the timing with which the detection device 12 detects the construction site 2 is not limited to the timing before starting the work of the day, and any timing may be employed.

The detection data acquisition unit 42 acquires the detection data from the detection device 9, the data being about each work machine 20 and a construction area around the work machine 20.

As described above, the detection device 9 detects part of the construction site 2. The part of the construction site 2 detected by the detection device 9 includes the work machine 20 that performs work. The part of the construction site 2 detected by the detection device 9 includes the construction area around the work machine 20 that performs work. An example of the construction area detected by the detection device 9 includes a construction area in which the work machine 20 is performing construction.

In the embodiment, the detection device 9 detects the construction site 2 at a second frequency higher than the first frequency. For example, the detection device 9 continuously detects the construction site 2 only for a certain period. For example, the detection device 9 continuously detects the construction site 2 only during a period in which the work of the work machine 20 is performed. Note that the detection device 9 may constantly detect the construction site 2. The detection data acquisition unit 42 acquires the detection data from the detection device 9 at the second frequency. The detection data acquired by the detection data acquisition unit 42 is updated more frequently than the current terrain data.

The recognition unit 43 recognizes the object on the construction site 2, on the basis of the detection data acquired by the detection data acquisition unit 42. As described above, the examples of the object include the work machine 20 and the person WM.

The recognition unit 43 recognizes the object by using artificial intelligence (AI) that analyzes the input data by an algorithm to output output data. The input data is the image data of the construction site 2 acquired by the detection device 9, and the output data is the object.

The recognition unit 43 holds a learning model generated by learning the features of the object. The learning model includes a learning model generated by learning the features of the work machine 20 and a learning model generated by learning the features of the person WM. In the generation of the learning model, machine learning is performed using a training image including the object as training data, thereby generating the learning model in which the features of the object are input and the object is output. The recognition unit 43 is configured to recognize the object by inputting the image data of the construction site 2 acquired by the detection device 9 to the learning model.

The reflection unit 44 generates reflection data in which the detection data acquired by the detection data acquisition unit 42 is reflected in the current terrain data. The current terrain data is the three-dimensional terrain data of the whole of the construction site 2 detected by the detection device 12 at the first frequency. The detection data includes three-dimensional terrain data of the construction area that is part of the construction site 2, detected by the detection device 9 at the second frequency. The detection data acquired by the detection data acquisition unit 42 is sequentially updated at the second frequency. The reflection unit 44 sequentially reflects the detection data acquired by the detection data acquisition unit 42, in part of the current terrain data at the second frequency. At least part of the current terrain data is sequentially updated with the detection data acquired by the detection data acquisition unit 42.

The detection data acquired by the detection data acquisition unit 42 includes updated terrain data that indicates an updated terrain of the construction area. The updated terrain includes the latest terrain during or after construction. The updated terrain data is updated at the second frequency. The reflection unit 44 reflects the updated terrain data acquired by the detection data acquisition unit 42 in the current terrain data stored in the current terrain storage unit 61.

The detection data acquired by the detection data acquisition unit 42 includes non-terrain data that indicates the object on the construction site 2. The non-terrain data is three-dimensional data that indicates the object being on the construction site 2. The non-terrain data is updated at the second frequency. The reflection unit 44 reflects the non-terrain data acquired by the detection data acquisition unit 42 in the current terrain data stored in the current terrain storage unit 61.

In the embodiment, the reflection unit 44 reflects the updated terrain data of the construction area in which the non-terrain data is removed from the detection data acquired by the detection data acquisition unit 42, in the current terrain data. The non-terrain data that indicates the object is recognized by the recognition unit 43. The reflection unit 44 removes the non-terrain data from the detection data to generate the updated terrain data. In addition, when the object is on the construction site 2, the reflection unit 44 generates the reflection data in which the object is reflected.

The reflection data generated by the reflection unit 44 includes updated terrain data of the construction area.

The reflection data generated by the reflection unit 44 includes the object recognized by the recognition unit 43.

The reflection data generated by the reflection unit 44 includes a three-dimensional model of the work machine 20 recognized by the recognition unit 43. The three-dimensional model of the work machine 20 includes computer graphics (CG) of the work machine 20.

The three-dimensional model of the work machine 20 is a three-dimensional model representing the work machine 20, and is constructed for each part constituting the work machines 20 such as the carriage 24, the swing body 25, and the working equipment 26. The three-dimensional model of the work machine 20 is stored in advance in the three-dimensional model storage unit 64.

The reflection data generated by the reflection unit 44 includes a symbol image that indicates the position of the object. The symbol image is image data that emphasizes the position of the object. The reflection unit 44 generates the symbol image on the basis of a result of the recognition by the recognition unit 43.

The output unit 45 outputs the reflection data generated by the reflection unit 44 to the information terminal 5. The output unit 45 transmits the reflection data to the information terminal 5 via the communication system 10.

The output unit 45 causes the display device 52 to display the reflection data generated by the reflection unit 44. The output unit 45 causes the display device 52 to display remotely operable work machines 20. The output unit 45 causes the display device 52 to display the reflection data in which the updated terrain data is reflected, together with the work machine 20. The output unit 45 causes the display device 52 to display the three-dimensional model of the work machine 20.

The selection data acquisition unit 46 acquires machine selection data that indicates specification of a work machine 20 to be remotely operated from among the work machines 20 displayed on the display device 52. The administrator at the remote place 13 is allowed to operate the input device 51 to specify the work machine 20 to be remotely operated. The operation of the input device 51 generates the machine selection data. The selection data acquisition unit 46 acquires, from the input device 51, the machine selection data that indicates specification of the work machine 20 to be remotely operated.

The remote operation permission unit 47 permits start of the remote operation of the work machine 20 on the basis of the machine selection data acquired by the selection data acquisition unit 46.

The remote operation command unit 48 transmits a remote operation command to the work machine 20 for which remote operation is permitted.

The work type storage unit 62 stores a work type corresponding to each of the plurality of work machines 20.

The work target storage unit 63 stores a work target corresponding to each of a plurality of the work types.

The three-dimensional model storage unit 64 stores the three-dimensional models of the work machines 20.

[Relationship Between Detection Device and Three-Dimensional Data]

As described above, the position sensor 14 and the attitude sensor 15 are mounted on the flight vehicle 8. The position sensor 14 is configured to detect the position of the detection device 9. The attitude sensor 15 is configured to detect the attitude of the detection device 9. The attitude sensor 15 is configured to detect the attitude of the detection device 9. The attitude includes, for example, a roll angle, a pitch angle, and a yaw angle. The yaw angle may be calculated on the basis of detection data from two GNSS sensors provided in the flight vehicle 8. The detection device 9 detects the three-dimensional data of the construction site 2. The three-dimensional data of the construction site 2 includes a relative distance and a relative position between the detection device 9 and each of a plurality of detection points defined in the detection target. The recognition unit

43 and the reflection unit 44 are configured to calculate, for example, the position of the three-dimensional data of the detection target in the global coordinate system, on the basis of detection data from the position sensor 14, detection data from the attitude sensor 15, and the detection data from the detection device 9. In addition, the recognition unit 43 and the reflection unit 44 are each configured to perform a predetermined coordinate transformation to calculate, for example, the position of the three-dimensional data of the detection target in a local coordinate system defined for the construction site 2. The detection target to be detected by the detection device 9 includes the updated terrain and the object.

Likewise, the current terrain data creation unit 41 is configured to calculate, for example, the position of the three-dimensional data of the detection target in the local coordinate system defined for the construction site 2, on the basis of detection data from the position sensor 16, detection data from the attitude sensor 17, and the detection data from the detection device 12. The detection target to be detected by the detection device 12 includes the current terrain.

The recognition unit 43 is configured to recognize the presence or absence of the object and the position of the object, on the basis of the detection data acquired by the detection data acquisition unit 42.

For example, when recognizing the position of the person WM, the recognition unit 43 recognizes the person WM on the basis of two-dimensional image acquired by the monocular camera of the detection device 9. In addition, the recognition unit 43 acquires the three-dimensional terrain data of the construction site 2. The recognition unit 43 is configured to recognize the position of the person WM on the construction site 2, on the basis of the person WM recognized on the basis of the two-dimensional image. For example, the position of the person WM on the construction site 2 is recognizable by performing image processing, on the person WM recognized on the basis of the two-dimensional images acquired by the two monocular cameras constituting the stereo camera, on the basis of the principle of triangulation, calculating the three-dimensional position of the person WM so as to correspond to the three-dimensional terrain data of the construction site 2. In addition, the position of the person WM on the construction site 2 may be recognized by calculating the three-dimensional position of the person WM recognized on the basis of the two-dimensional image by using a detection value of the laser sensor or radar sensor so as to correspond to the three-dimensional terrain data of the construction site 2. Note that the recognition unit 43 may recognize the position of the person WM from the three-dimensional data of the construction site 2. Note that the recognition unit 43 may recognize the position of the person WM on the basis of detection data from a position sensor held by the person WM. For example, if the person WM holds a smartphone and a GNSS sensor is mounted on the smartphone, the recognition unit 43 is allowed to recognize the position of the person WM on the basis of detection data from the GNSS sensor of the smartphone. Note that the position sensor held by the person WM may use a beacon. Note that the position of the person WM on the construction site 2 may be estimated by geometric calculation, on the basis of coordinates, on the two-dimensional image, of the person WM recognized on the basis of the two-dimensional image, a three-dimensional position and attitude of the detection device 9, and the three-dimensional terrain data.

In addition, the recognition unit 43 is configured to recognize the movements of the work machines 20, on the basis of the detection data acquired by the detection data acquisition unit 42. The excavator 21 is configured to operate the carriage 24, the swing body 25, and the working equipment 26. The crawler carrier 23 is configured to operate the carriage 28 and the dump body 30. The reflection unit 44 is configured to move the three-dimensional model in synchronization with each of the work machines 20.

[Construction Management Method]

Figure 5:
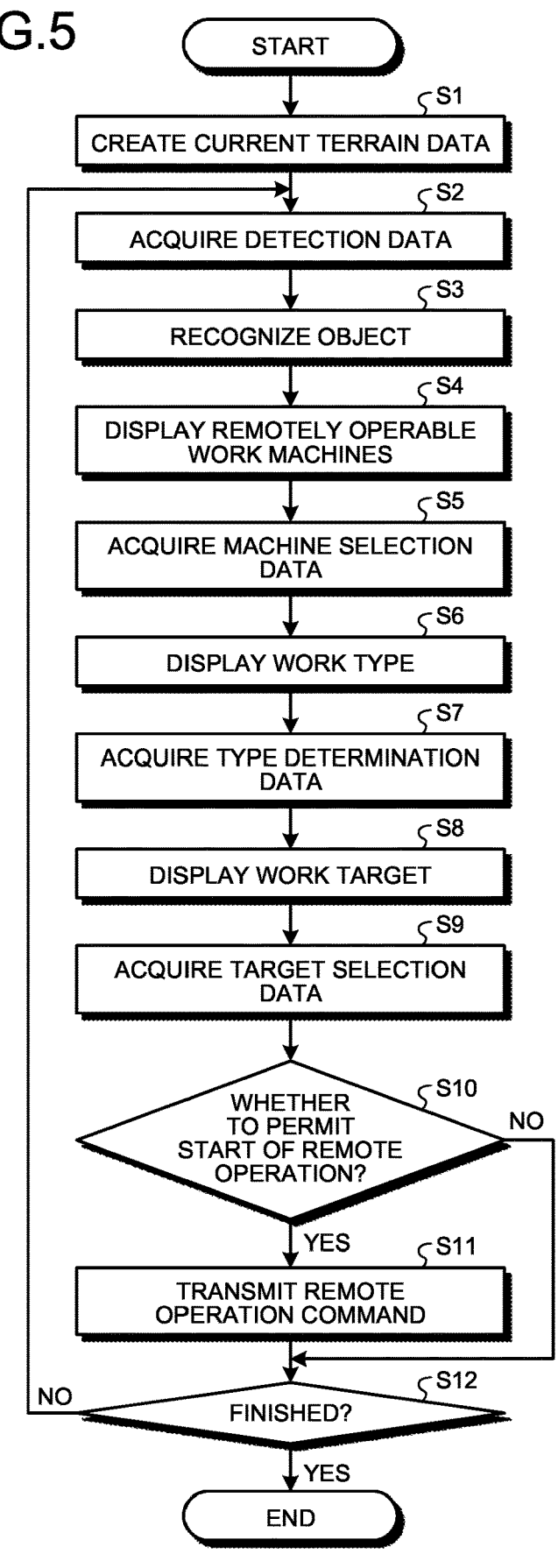
FIG. 5 is a flowchart illustrating a construction management method according to an embodiment.

FIG. 5 is a flowchart illustrating a construction management method according to an embodiment. The current terrain data creation unit 41 creates the current terrain data of the construction site 2 on which the work machine 20 performs an operation (Step S1).

Figure 6:
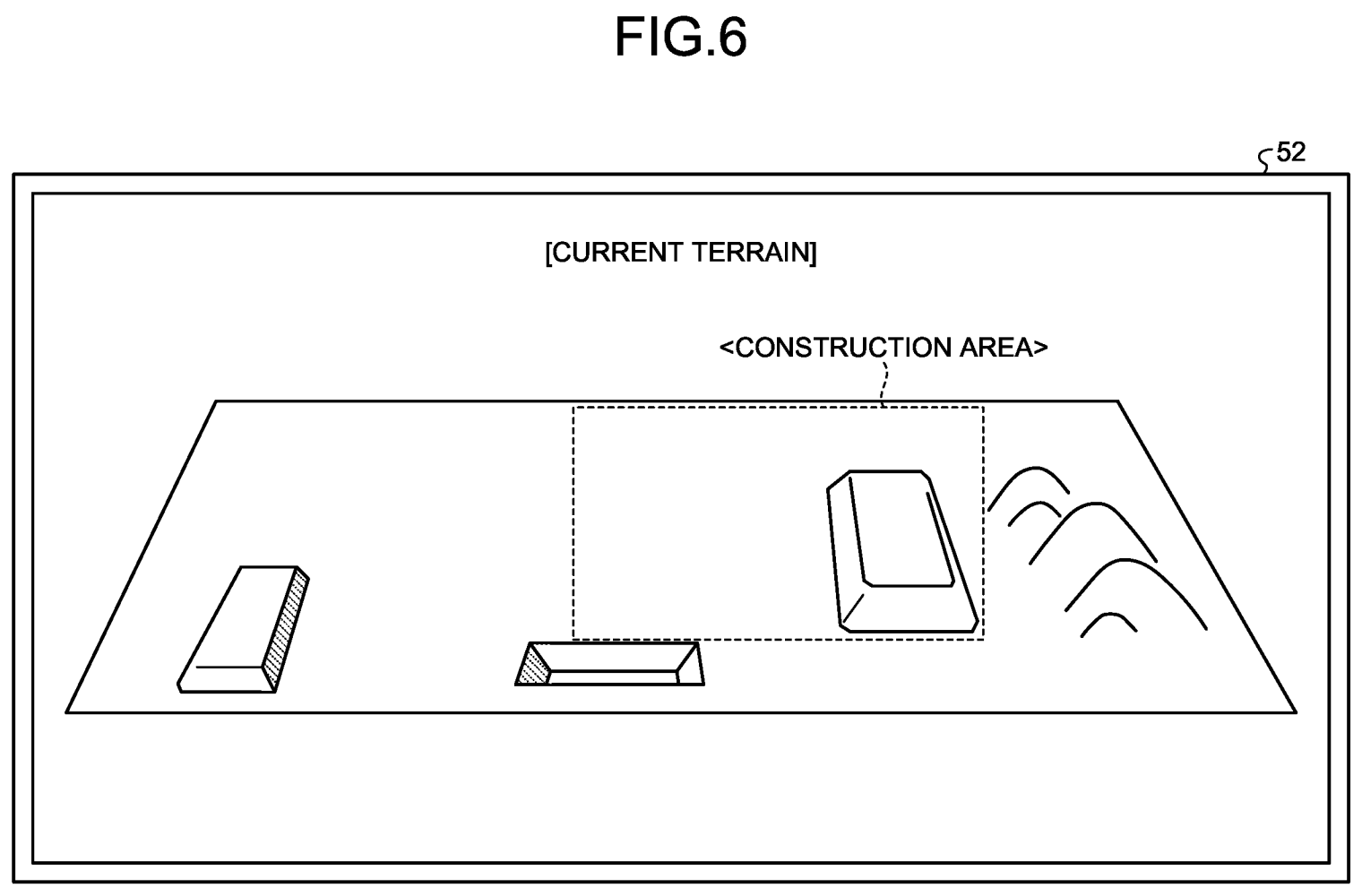

FIG. 6 is a diagram illustrating the current terrain data according to the embodiment. The current terrain data is the three-dimensional terrain data that indicates the current terrain of the whole of the construction site 2. The current terrain data creation unit 41 acquires the detection data from the detection device 12. The current terrain data creation unit 41 creates the current terrain data on the basis of the detection data from the detection device 12.

The current terrain data created by the current terrain data creation unit 41 is stored in the current terrain storage unit 61. The output unit 45 is configured to transmit the current terrain data to the information terminal 5. The display device 52 is configured to display the current terrain as illustrated in FIG. 6.

When work of the work machine 20 is started on the construction site 2, the terrain of the construction site 2 changes. The detection device 9 mounted on the flight vehicle 8 detects the construction site 2. The detection device 9 detects, for example, the work machine 20 performing work and the construction area around the work machine 20. Detection data from the detection device 9 is transmitted to the management device 3 via the cable 7. The management device 3 transmits the detection data from the detection device 9 to the server 4. The detection data acquisition unit 42 acquires the detection data from the detection device 9, the data being obtained by detecting the work machine 20 and the construction area around the work machine 20 (Step S2).

The recognition unit 43 recognizes that the object is on the construction site 2, on the basis of the detection data acquired by the detection data acquisition unit 42 (Step S3).

The reflection unit 44 reflects the detection data acquired by the detection data acquisition unit 42 in the current terrain data stored in the current terrain storage unit 61 to generate the reflection data. The detection data acquired by the detection data acquisition unit 42 includes updated terrain data of the construction area that is part of the construction site 2. The reflection unit 44 reflects the updated terrain data in the current terrain data.

For example, when part of the construction site 2 is excavated by the excavator 21, the detection data including an excavated position is acquired by the detection data acquisition unit 42, as the updated terrain data. The updated terrain data includes the excavated position excavated by the excavator 21. The reflection unit 44 combines part of the current terrain data and the updated terrain data. The reflection unit 44 applies the updated terrain data to the part of the current terrain data. Therefore, the reflection data in which the updated terrain data including the excavated position is reflected is generated.

The detection data acquired by the detection data acquisition unit 42 includes the updated terrain data of the construction area. The reflection unit 44 reflects the updated terrain data in the current terrain data to generate the reflection data. Furthermore, the reflection unit 44 generates the reflection data in which the object is reflected.

The output unit 45 outputs the reflection data generated by the reflection unit 44 to the information terminal 5. The display device 52 displays the reflection data transmitted from the output unit 45.

Figure 7:
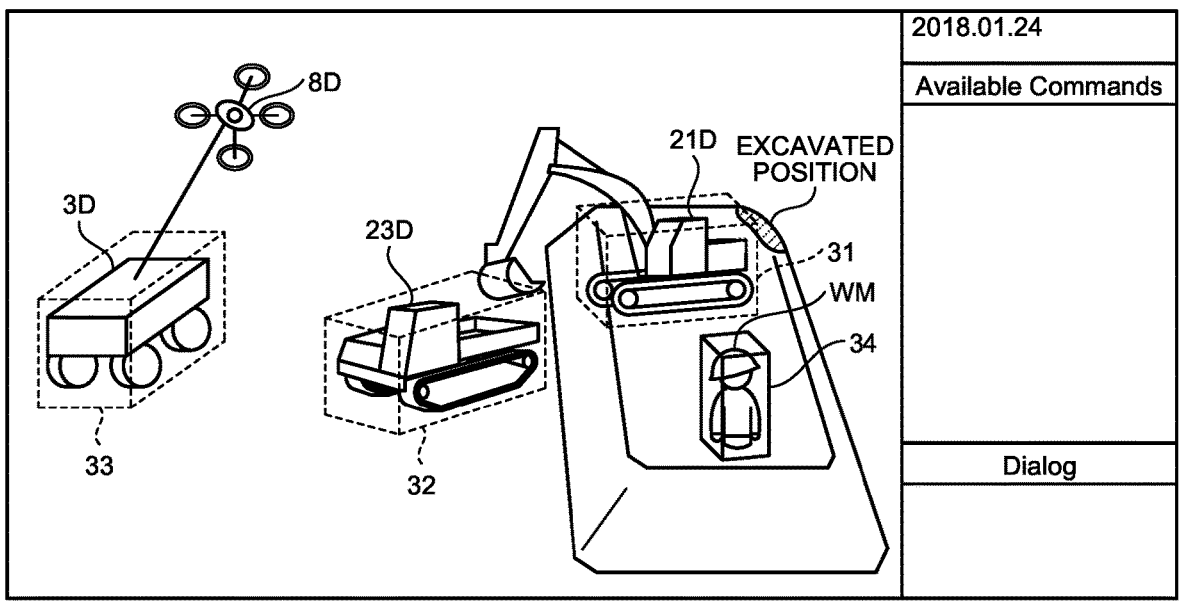
FIG. 7 is a diagram illustrating exemplary display on a display device according to an embodiment.

FIG. 7 is a diagram illustrating exemplary display on the display device 52 according to an embodiment. As illustrated in FIG. 7, the display device 52 is configured to display the reflection data. The reflection data includes image data of the construction area. For example, with the progress of construction in the construction area, at least part of the terrain of the construction site 2 changes as illustrated in FIG. 7. In the example illustrated in FIG. 7, the excavated position is generated in the construction area by the excavation work of the excavator 21. The detection data acquired by the detection data acquisition unit 42 includes the updated terrain data of the construction area. The reflection unit 44 reflects the change of the terrain of the construction site 2 in the current terrain, in real time. The reflection unit 44 reflects the updated terrain data in the current terrain data, in real time. As illustrated in FIG. 7, the display device 52 is configured to display the reflection data in which the excavated position is reflected. The administrator at the remote place 13 is allowed to confirm the reflection data displayed on the display device 52 to recognize the progress of the construction on the construction site 2 in real time.

In the example illustrated in FIG. 7, the excavator 21, the crawler carrier 23, the management device 3, the flight vehicle 8, and the person WM are in the construction area, as the objects. The reflection data includes the three-dimensional terrain data in which the updated terrain data is reflected in part of the current terrain data. The reflection data includes the three-dimensional model of the work machine 20 recognized by the recognition unit 43. In the example illustrated in FIG. 7, the three-dimensional models of the work machines 20 include a three-dimensional model 21D of the excavator 21, a three-dimensional model 23D of the crawler carrier 23, a three-dimensional model 3D of the management device 3, and a three-dimensional model 8D of the flight vehicle 8.

In displaying a three-dimensional model of each work machine 20 on the display device 52, the recognition unit 43 calculates the position (three-dimensional position) and attitude of the work machine 20, on the basis of the detection data from the detection device 12, acquired by the detection data acquisition unit 42. The attitude of the work machine 20 includes inclination of the swing body 25 relative to a horizontal plane and a turning angle of the swing body 25 relative to the carriage 24. Furthermore, the attitude of the work machine 20 includes an angle of the working equipment 26. The angle of the working equipment 26 includes an angle of the boom 26A, an angle of the arm 26B, and an angle of the bucket 26C. The detection data from the detection device 12 includes an image acquired by a stereo camera. Therefore, the recognition unit 43 is configured to calculate the three-dimensional position and attitude of the work machine 20, on the basis of the detection data from the detection device 12. The reflection unit 44 adjusts the three-dimensional model so that the three-dimensional model stored in the three-dimensional model storage unit 64 is arranged at the position calculated by the recognition unit 43 and is in the attitude calculated by the recognition unit 43, generating the reflection data.

As described above, the three-dimensional model of the work machine 20 is constructed for each part constituting the work machines 20 such as the carriage 24, the swing body 25, and the working equipment 26. The reflection unit 44 changes the angle of a corresponding portion of the three-dimensional model on the basis of the angle of the boom 26A, the angle of the arm 26B, the angle of the bucket 26C, and the turning angle of the swing body 25, adjusting the three-dimensional model.

The output unit 45 outputs the reflection data including the three-dimensional model generated by the reflection unit 44, to the display device 52.

Note that in a case where two GNSS sensors are mounted on the swing body 25 of the work machine 20, the recognition unit 43 may calculate the position of the work machine 20 on the basis of detection data from one GNSS sensor. Furthermore, the recognition unit 43 may calculate the inclination and turning angle of the swing body 25 on the basis of the detection data from each of the two GNSS sensors. In a case where a stroke sensor is provided in each of the boom cylinder 27A, the arm cylinder 27B, and the bucket cylinder 27C, the recognition unit 43 may calculate the angle of the working equipment 26 on the basis of detection data from each stroke sensor.

For example, the recognition unit 43 is configured to calculate the position of the flight vehicle 8 on the basis of detection data from at least one of the two GNSS sensors mounted on the flight vehicle 8, when displaying the three-dimensional model of the flight vehicle 8 on the display device 52. Furthermore, the recognition unit 43 is configured to calculate an inclination of the flight vehicle 8 on the basis of the detection data from each of the two GNSS sensors. Note that, in a case where the inertial measurement unit (IMU) is mounted on the flight vehicle 8, the recognition unit 43 may calculate the inclination of the flight vehicle 8 on the basis of detection data from the inertial measurement unit. The recognition unit 43 stores the three-dimensional model of the flight vehicle 8. The recognition unit 43 adjusts the stored three-dimensional model so that the stored three-dimensional model is located at the calculated position and has the calculated inclination to cause the display device 52 to display the adjusted three-dimensional model.

The reflection data includes the symbol image that indicates the position of the object. In the example illustrated in FIG. 7, the reflection data includes a symbol image 31 that indicates the position of the excavator 21, a symbol image 32 that indicates the position of the crawler carrier 23, a symbol image 33 that indicates the position of the management device 3, and a symbol image 34 that indicates the position of the person WM. Note that the reflection data preferably includes at least one of the symbol image 31, the symbol image 32, the symbol image 33, and the symbol image 34.

The reflection unit 44 is configured to generate the symbol image 31 on the basis of the position of the excavator 21 recognized by the recognition unit 43. In the example illustrated in FIG. 7, the symbol image 31 has a frame shape (box shape) surrounding the three-dimensional model 21D. The reflection unit 44 generates the reflection data so that the three-dimensional model 21D of the excavator 21 and the symbol image 31 are displayed in a superimposed manner. Note that the symbol image 31 may be displayed adjacent to the three-dimensional model 21D. Emphasizing the three-dimensional model 21D with the symbol image 31 allows the administrator at the remote place 13 to smoothly recognize the presence of the excavator 21. Note that the symbol image 31 may have any shape as long as the excavator 21 is emphasized. Note that the symbol image 31 may be displayed and the three-dimensional model 21D may not be displayed.

Likewise, the reflection unit 44 is configured to generate the symbol image 32 on the basis of the position of the crawler carrier 23 recognized by the recognition unit 43. The reflection unit 44 is configured to generate the symbol image 33 on the basis of the position of the management device 3 recognized by the recognition unit 43. The reflection unit 44 generates the symbol image 34 on the basis of the position of the person WM recognized by the recognition unit 43.

In the embodiment, each of the excavator 21 and the crawler carrier 23 is the remotely operable work machine 20. The output unit 45 causes the display device 52 to display remotely operable work machines 20. The remotely operable work machines 20 displayed on the display device 52 include the excavator 21 (first work machine) and the crawler carrier 23 (second work machine) (Step S4).

The administrator at the remote place 13 operates the input device 51 to specify the work machine 20 to be remotely operated, from the work machines 20 displayed on the display device 52.

Figure 8:
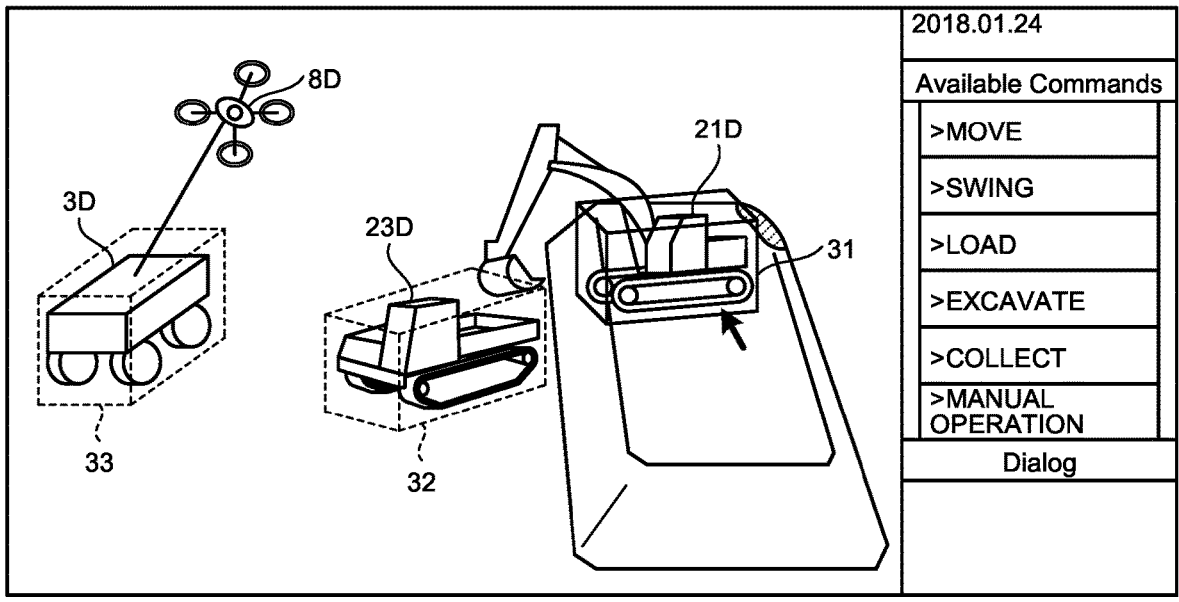
FIG. 8 is a diagram illustrating exemplary display on the display device according to the embodiment.

FIG. 8 is a diagram illustrating exemplary display on the display device 52 according to the embodiment. In the embodiment, the input device 51 includes a mouse that operates a pointer moving on a display screen of the display device 52. In the example illustrated in FIG. 8, the administrator specifies the three-dimensional model 21D that indicates the excavator 21, via the input device 51. When the three-dimensional model 21D is selected, the symbol image 31 is highlighted.

When an instruction for the three-dimensional model 21D is given, a display form of the three-dimensional model 21D may be changed. For example, when an instruction for the three-dimensional model 21D is given, the color of the three-dimensional model 21D may be changed, or the line type of the frame indicating the three-dimensional model 21D may be changed.

The selection data acquisition unit 46 acquires the machine selection data that indicates specification of the excavator 21 (Step S5).

The output unit 45 causes the display device 52 to display a work type corresponding to the specified excavator 21 (Step S6).

The work type of the work machine 20 refers to the type of movement or work that can be performed by the work machine 20. The work type corresponding to the work machine 20 is determined in advance and stored in the work type storage unit 62. The work type storage unit 62 stores a work type corresponding to each of the plurality of work machines 20. In the embodiment, the work type storage unit 62 stores the work type for each work machine, such as the work type corresponding to the excavator 21, the work type corresponding to the bulldozer 22, and the work type corresponding to the crawler carrier 23.

The output unit 45 outputs a signal for displaying the work type on the display device 52, on the basis of the machine selection data acquired by the selection data acquisition unit 46 and stored data stored in the work type storage unit 62.

In the embodiment, the machine selection data that indicates specification of the excavator 21 is acquired by the selection data acquisition unit 46. The output unit 45 causes the display device 52 to display work types corresponding to the excavator 21, from among the work types of the plurality of work machines 20 stored in the work type storage unit 62.

As illustrated in FIG. 8, "move", "swing", "load", "excavate", "collect", and "manual operation" are displayed as the work types of the excavator 21. In the embodiment, the work machine 20 is automatically operated. The "move" refers to the movement of automatic traveling of the carriage 24. The "swing" refers to the movement of automatic swing of the swing body 25. The "load" refers to work to load onto a loading target automatically with the working equipment 26. The "excavate" refers to work to automatically excavate an excavation object with the working equipment 26. The "collect" refers to work to automatically collect load on the ground to one place with the working equipment 26. The "manual operation" refers to remote operation of the excavator 21 by using an operation lever provided at the remote place 13.

The administrator at the remote place 13 operates the input device 51 to specify a work type to be performed by the excavator 21, from the plurality of the work types displayed on the display device 52.

Figure 9:
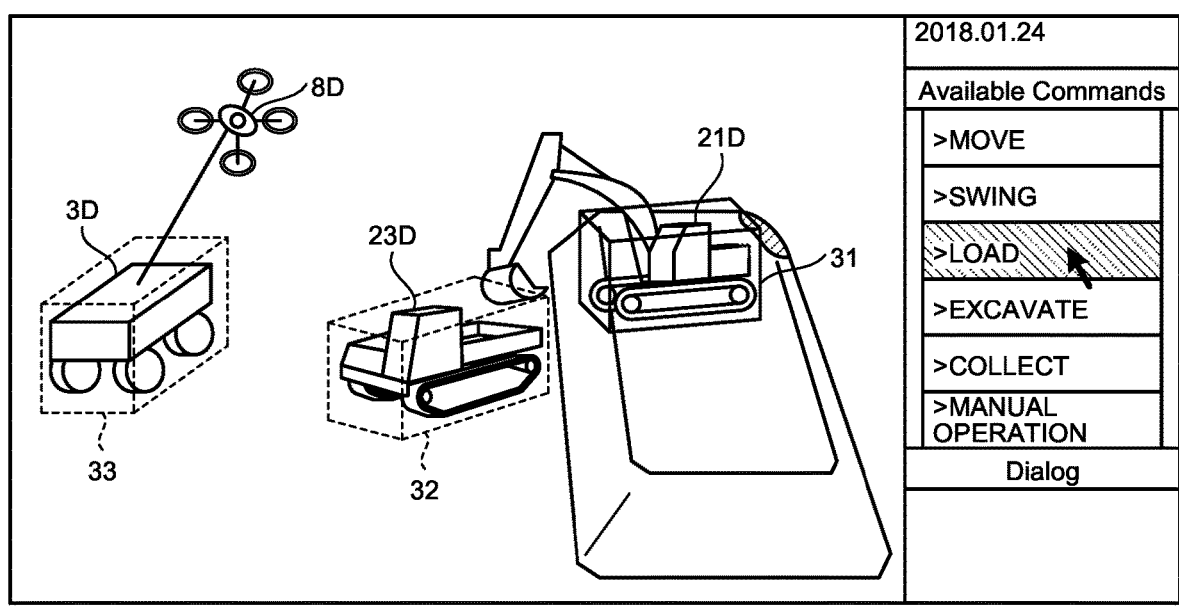
FIG. 9 is a diagram illustrating exemplary display on the display device according to the embodiment.

FIG. 9 is a diagram illustrating exemplary display on the display device 52 according to the embodiment. In the example illustrated in FIG. 9, the operator operates the input device 51 to specify "load".

The selection data acquisition unit 46 acquires type selection data that indicates specification of "load" as the work type to be performed by the excavator 21 (Step S7).

The output unit 45 causes the display device 52 to display a work target corresponding to the specified "load" (Step S8).

The work target for the work machine 20 refers to a target for which the work machine 20 performs work. The work target corresponding to the work type is determined in advance and stored in the work target storage unit 63. The work target storage unit 63 stores a work target corresponding to each of a plurality of the work types. In the embodiment, the work target storage unit 63 stores a work target corresponding to "move", a work target corresponding to "swing", a work target corresponding to "load", a work target corresponding to "excavate", and a work target corresponding to "collect". An example of the work target corresponding to "move" includes "movement destination". An example of the work target corresponding to "swing" includes "swing destination". Examples of the work target corresponding to "load" include "crawler carrier" and "loading destination". An example of the work target corresponding to "excavate" includes "excavation destination". An example of the work target corresponding to "collect" includes "collection destination".

The output unit 45 outputs a signal for displaying the work target on the display device 52, on the basis of the type selection data acquired by the selection data acquisition unit 46 and stored data in the work target storage unit 63.

In the embodiment, the type selection data that indicates specification of "load" is acquired by the selection data acquisition unit 46. The output unit 45 causes the display device 52 to display the work target corresponding to "load", from among a plurality of the work targets stored in the work target storage unit 63.

Examples of the work target corresponding to "load" include "crawler carrier" and "loading destination".

Figure 10:
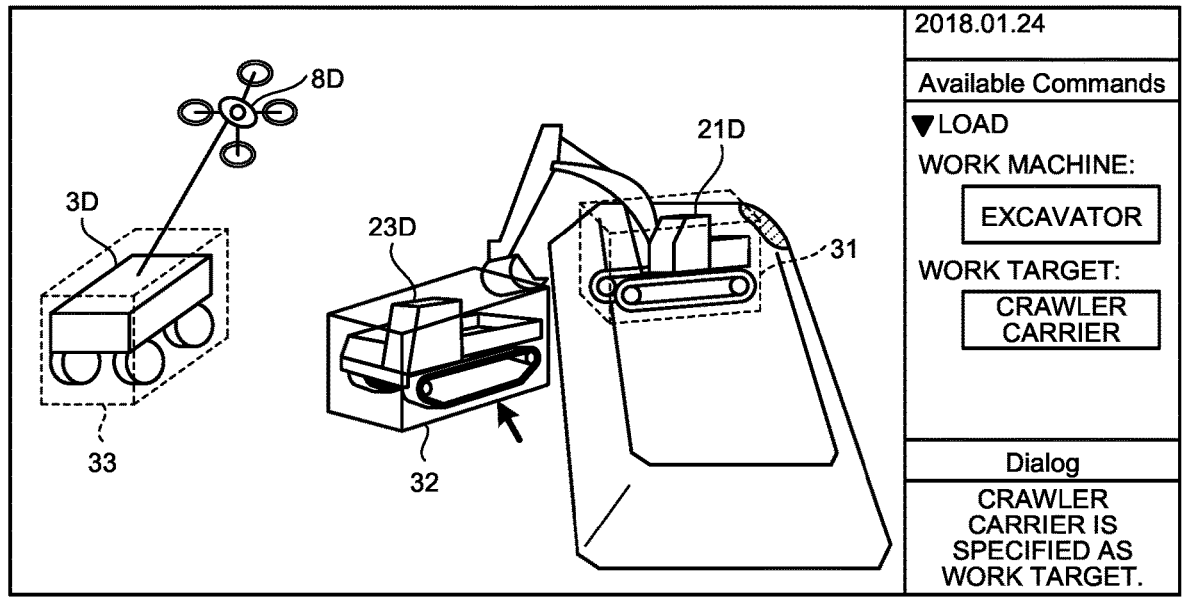
FIG. 10 is a diagram illustrating exemplary display on the display device according to the embodiment.

FIG. 10 is a diagram illustrating exemplary display on the display device 52 according to the embodiment. In the example illustrated in FIG. 10, the administrator at the remote place 13 operates the input device 51 to specify the three-dimensional model 23D indicating the crawler carrier 23, from the plurality of the work targets displayed on the display device 52, as the work target. When the three-dimensional model 23D is selected, the symbol image 32 is highlighted.

The selection data acquisition unit 46 acquires target selection data that indicates specification of the crawler carrier 23, as the work target (Step S9).

After the excavator 21, the work type, and the work target are specified, the administrator at the remote place 13 starts the remote operation of the excavator 21.

Figure 11:
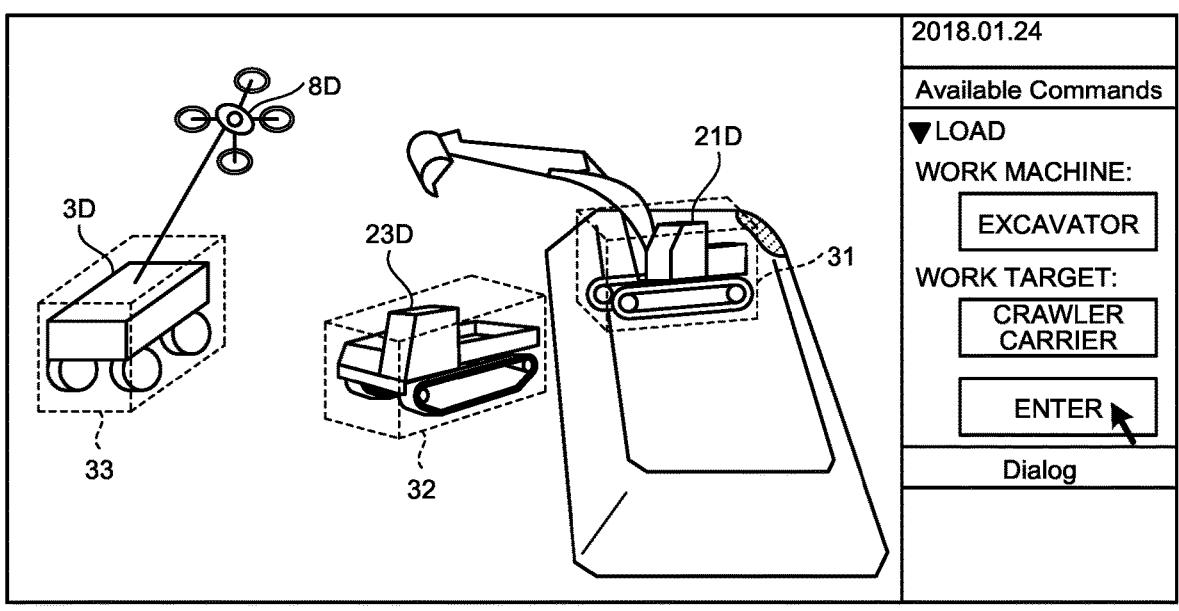
FIG. 11 is a diagram illustrating exemplary display on the display device according to the embodiment.

FIG. 11 is a diagram illustrating exemplary display on the display device 52 according to the embodiment. In the example illustrated in FIG. 11, a symbol "execute" is displayed on the display device 52. The operator operates the symbol "execute" via the input device 51.

The remote operation permission unit 47 determines whether to permit the start of the remote operation, on the basis of the specified work type and the situation around the excavator 21 (Step S10).

For example, when an obstacle is around the excavator 21, when there is no loading target, or when a situation in which loading the dump body 30 cannot be performed occurs, the remote operation permission unit 47 does not permit the start of the remote operation. The recognition unit 43 is configured to recognize the obstacle, on the basis of the detection data acquired by the detection data acquisition unit 42. The recognition unit 43 is configured to recognize the obstacle, for example, by using the artificial intelligence. When the recognized obstacle is around the work machine 20, the remote operation permission unit 47 determines not to permit the start of the remote operation. In addition, when the recognized obstacle is between the work machine 20 and the work target, the remote operation permission unit 47 may determine not to permit the start of the remote operation. Likewise, the recognition unit 43 is configured to recognize the loading target that is the work target, for example, by using the artificial intelligence. When the loading target is not recognized, the remote operation permission unit 47 determines not to permit the start of the remote operation. Likewise, for example, use of the artificial intelligence allows the recognition unit 43 to recognize a current loaded amount of the dump body 30 and allows the work machine 20 to recognize a loading amount. When the recognition unit 43 recognizes that the situation in which loading the dump body 30 cannot be performed occurs, on the basis of the current loaded amount of the dump body 30 and the loading amount of the work machine 20, the remote operation permission unit 47 determines not to permit the start of the remote operation.

In Step S10, when the start of the remote operation is not permitted (Step S10: No), the remote operation of the excavator 21 is not performed. The remote operation command is not output from the remote operation command unit 48. When the start of the remote operation is permitted in Step S10 (Step S10: Yes), the remote operation command is transmitted from the remote operation command unit 48 to the excavator 21 (Step S11).

The excavator 21 starts loading work onto the crawler carrier 23, on the basis of the remote operation command.

The reflection data displayed on the display device 52 includes the three-dimensional model 21D that moves in synchronization with the excavator 21. As described above, the recognition unit 43 is configured to recognize the movement of the work machine 20. The reflection unit 44 is configured to move the three-dimensional model 21D on the display device 52 in synchronization with the movement of the excavator 21 on the basis of the movement of the excavator 21 recognized by the recognition unit 43. When the remote movement is started and the movement of the excavator 21 is started, the three-dimensional model 21D of the excavator 21 moves on the display device 52 in synchronization with the excavator 21. FIG. 11 illustrates an example of a rising movement of a boom of the three-dimensional model 21D in synchronization with the rising movement of the boom 26A of the excavator 21.

The remote operation permission unit 47 determines whether the remote operation has been finished (Step S12).

When it is determined in Step S12 that the remote control has finished (Step S12: Yes), the construction management method according to the embodiment is finished. When it is determined in Step S12 that the remote operation has not been finished (Step S12: No), the processing from Step S2 to Step S11 is repeated.

For example, when loading by the excavator 21 onto the crawler carrier 23 is finished, the administrator at the remote place 13 operates the input device 51 to switch the work machine 20 to be remotely operated, from the excavator 21 to the crawler carrier 23. The administrator at the remote place 13 specifies the three-dimensional model 23D of the crawler carrier 23 displayed on the display device 52, via the input device 51. When the crawler carrier 23 is specified, the selection data acquisition unit 46 acquires the machine selection data that indicates specification of the crawler carrier 23 (Step S5). When the crawler carrier 23 is specified, the work types corresponding to the crawler carrier 23 are displayed on the display device 52 (Step S6). Examples of the work type corresponding to the crawler carrier 23 include "proceed to a loading position", "leave the loading position", and "dumping movement". The administrator at the remote place 13 specifies, for example, "leave the loading position". The selection data acquisition unit 46 acquires the type selection data that indicates specification of "leave the loading position" (Step S7). When "leave the loading position" is specified, the work target corresponding to "leave the loading position" is displayed on the display device 52 (Step S8). Examples of the work target corresponding to "leave the loading position" include "first dumping position", "second dumping position", and "third dumping position". The administrator at the remote place 13 specifies, for example, "first dumping position". The selection data acquisition unit 46 acquires the target selection data that indicates specification of "first dumping position" (Step S9). When "first dumping position" is specified, it is determined whether to permit the start of the remote operation (Step S10). For example, when the obstacle is between the loading position and the first dumping position, the start of the remote operation is not permitted. When the start of the remote operation is permitted in Step S10, the crawler carrier 23 leaves the loading position and starts traveling toward the first dumping position.

Note that the remote operation command may be transmitted from the remote operation command unit 48 to the work machine 20 so that the remote operation command is transmitted to another work machine 20 before completion of the remote operation of the work machine 20. For example, before completion of the remote operation of the work machine 20, the another work machine 20 displayed on the display device 52 may be specified to specify a work type and work target of the another work machine 20. In addition, it may be determined whether to permit the start of the remote operation of the another work machine 20.

[Computer System]

Figure 12:
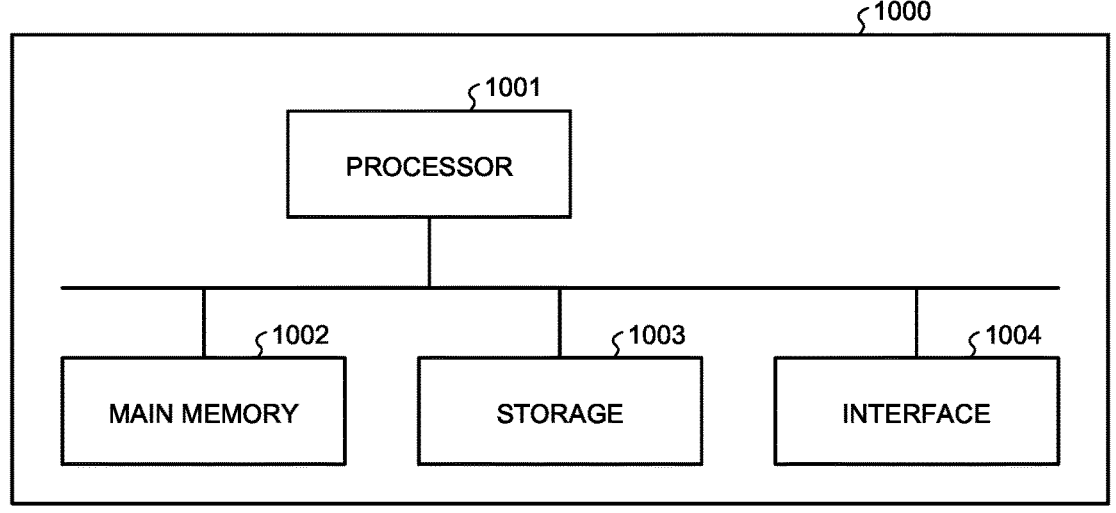
FIG. 12 is a block diagram illustrating a computer system according to an embodiment.

FIG. 12 is a block diagram illustrating a computer system 1000 according to an embodiment. The server 4 described above includes the computer system 1000. The computer system 1000 includes a processor 1001 such as a central processing unit (CPU), a main memory 1002 that includes a nonvolatile memory such as a read only memory (ROM) and a volatile memory such as a random access memory (RAM), a storage 1003, and an interface 1004 that includes an input/output circuit. The functions of the server 4 described above are stored, as computer programs, in the storage 1003. The processor 1001 reads the computer programs from the storage 1003, loads the programs into the main memory 1002, and executes processing described above according to the computer programs. Note that the computer programs may be distributed to the computer system 1000 via a network.

According to the embodiments described above, the computer programs or the computer system 1000 is configured to execute displaying the remotely operable work machines 20 on the display device 52, acquiring the machine selection data that indicates specification of the work machine 20, and permitting the start of the remote control of the work machine 20 on the basis of the machine selection data.

Effects

As described above, according to the embodiments, the remotely operable work machines 20 are displayed on the display device 52. The administrator at the remote place 13 is allowed to specify the work machine 20 that the administrator desires to remotely operate, via the input device 51. When a plurality of work machines 20 is on the construction site 2, the administrator at the remote place 13 is allowed to select any work machine 20 to be remotely operated according to the situation of the construction site 2. When the work machine 20 to be remotely operated is specified, the machine selection data that indicates specification of the work machine 20 to be remotely operated is generated. When the machine selection data is generated, the start of the remote operation of the specified work machine 20 is permitted. When the work machine 20 is not specified, the remote operation of the work machine 20 is not permitted. The administrator at the remote place 13 is allowed to select any work machine 20 that the administrator desires to remotely operate, according to the situation of the construction site 2. Therefore, a reduction in construction efficiency of the construction site 2 is suppressed.

When a plurality of the remotely operable work machines 20 is displayed on the display device 52 and the excavator 21 is specified in such a state, the start of the remote operation of the excavator 21 is permitted. When the crawler carrier 23 is specified, the start of the remote operation of the crawler carrier 23 is permitted. The administrator at the remote place 13 is allowed to sequentially remotely operate the plurality of work machines 20.

The work types corresponding to the work machine 20 specified as a remote operation target are displayed on the display device 52. Therefore, the administrator at the remote place 13 is allowed to select any of the work types.

The work type corresponding to each of the plurality of work machines 20 is stored in advance in the work type storage unit 62. Therefore, the output unit 45 is configured to cause the display device 52 to display the work types on the basis of the machine selection data and the stored data in the work type storage unit 62.

The work targets corresponding to the work type to be performed by the work machine 20 specified as the remote operation target are displayed on the display device 52. Therefore, the administrator at the remote place 13 is allowed to select any of the work targets.

The work target corresponding to each of the plurality of the work types is stored in advance in the work target storage unit 63. Therefore, the output unit 45 is configured to cause the display device 52 to display the work targets, on the basis of the type selection data and the stored data in the work target storage unit 63.

The remote operation permission unit 47 determines whether to permit the start of the remote operation, on the basis of the specified work type and the situation around the work machine 20. Therefore, the remote operation is not started in an inappropriate situation of the remote operation.

After the remote operation command is transmitted from the remote operation command unit 48 to the work machine 20 and before the remote operation of the work machine 20 is completed, another work machine 20 displayed on the display device 52 is allowed to be specified to specify the work type and work target of the another work machine 20. Therefore, the remote operation of the plurality of work machines 20 can be efficiently performed.

Other Embodiments

In the embodiments described above, one remotely operable work machines 20 may be displayed on the display device 52. Specifying the work machine 20 displayed on the display device 52 via the input device 51, the start of the remote operation of the work machine 20 is permitted. When the work machine 20 displayed on the display device 52 is not specified via the input device 51, the start of the remote operation of the work machine 20 is not permitted. After the start of the remote operation of the work machine 20 is permitted, the administrator at the remote place 13 is allowed to remotely operate the work machine 20.

In the embodiments described above, the administrator at the remote place 13 operates the mouse as the input device 51 to specify the work machine 20 to be remotely operated, the work type, or to specify the work target. For example, when a voice input device is provided in the information terminal 5, the administrator at the remote place 13 may specify the work machine 20 to be remotely operated, the work type, or the work target, by voice.

In the embodiments described above, the output unit 45 is configured to cause the display device 52 to display the work type corresponding to the specified work machine 20 or cause the display device 52 to display the work target corresponding to the specified work type. For example, when a voice output device is provided in the information terminal, the output unit 45 may cause the voice output device to output the work type corresponding to the specified work machine 20 or may cause the voice output device to output the work target corresponding to the specified work type.

In the embodiments described above, a driver may be on the work machine 20. For example, when the driver is on the excavator 21, the administrator at the remote place 13 is allowed to operate the input device 51 to specify the work type and the work target. The type selection data and the target selection data specified by using the input device 51 are transmitted to the excavator 21 via the communication system 10. In the cab of the excavator 21, an output device is arranged that outputs the type selection data and target selection data specified through the input device 51. Examples of the output device include a monitor and a speaker. The driver of the excavator 21 may operate the excavator 21 on the basis of the type selection data and target selection data specified through the input device 51. For example, when "load" is specified and "first dump truck" is specified as the loading target, the driver of the excavator 21 is allowed to operate the excavator 21 to perform loading work onto the "first dump truck".

In the embodiments described above, the recognition unit 43 recognizes the position of the work machine 20 on the basis of the detection data from the detection device 9. For example, a position sensor that detects the position of the work machine 20 may be provided at the work machine 20 so that the recognition unit 43 may recognize the position of the work machine 20 on the basis of detection data from the position sensor.

In the embodiments described above, the recognition unit 43 recognizes the movement of the work machine 20 on the basis of the detection data from the detection device 9. For example, a motion sensor that detects the movement of the work machine 20 may be provided at the work machine 20 so that the recognition unit 43 may recognize the movement of the work machine 20 on the basis of detection data from the motion sensor. An example of the motion sensor includes, for example, an angle sensor that detects the motion of the working equipment 26 or a stroke sensor that detects the expansion/contraction amount of the hydraulic cylinder 27.

In the embodiments described above, the recognition unit 43 may recognize the object on the basis of, for example, a pattern matching method without using the artificial intelligence. The recognition unit 43 is configured to recognize the object by collating a template that indicates the person WM with the image data of the construction site 2.

In the embodiments described above, the detection device 9 may not be mounted on the flight vehicle 8. The detection device 9 may be mounted on, for example, the work machine 20 or may be mounted to a structure on the construction site 2. The same applies to the detection device 12.

In the embodiment described above, the work type storage unit 62 stores the work type corresponding to each of the plurality of work machines 20 in advance. Furthermore, in the work target storage unit 63, the work target corresponding to each of the plurality of the work types is stored in advance. In another embodiment, the work machine 20 may transmit information indicating the work types and the work targets corresponding to the respective work types to the server 4 via the communication system 10 so that the output unit 45 may display the work types and the work targets on the display device 52 on the basis of the received information.

In the embodiments described above, each of the current terrain data creation unit 41, the detection data acquisition unit 42, the recognition unit 43, the reflection unit 44, the output unit 45, the selection data acquisition unit 46, the remote operation permission unit 47, the remote operation command unit 48, the current terrain storage unit 61, the work type storage unit 62, and the work target storage unit 63 may be constituted by different pieces of hardware. For example, at least one of the function of the current terrain data creation unit 41, the function of the detection data acquisition unit 42, the function of the recognition unit 43, the function of the reflection unit 44, the function of the output unit 45, the function of the selection data acquisition unit 46, the function of the remote operation permission unit 47, the function of the remote operation command unit 48, the function of the current terrain storage unit 61, the function of the work type storage unit 62, and the function of the work target storage unit 63 may be provided in the management device 3, or may be provided in a server different from the server 4.

In the embodiments described above, the management device 3 is supported by the carrier 6 and is configured to travel on the construction site 2. The management device 3 may be mounted on each work machine 20 or may be installed at a predetermined position on the construction site 2.

In the embodiments described above, the detection device 12 detects the whole of the construction site 2, and the detection device 9 detects part of the construction site 2. The detection device 9 may detect the whole of the construction site 2.

In the embodiments described above, the detection target to be detected by the detection device 9 is not limited to the terrain of the construction site 2, the work machine 20, and the person WM. In another embodiment, the detection device 9 may detect the construction material.

In the embodiments described above, the information terminal 5 may not be arranged at the remote place 13 from the construction site 2. The information terminal 5 may be mounted, for example, on the work machine 20. Furthermore, the information terminal 5 may be omitted. The progress of construction may be output to the work machine 20 from the monitor. The monitor may include not only a display device but also an input device.

In the embodiments described above, the output unit 45 causes the display device 52 to display the remotely operable work machines 20. In another embodiment, the remotely operable work machine 20 and the work machine 20 that cannot be remotely operated may be displayed on the display device 52.

In the embodiments described above, the work machine 20 is not limited to the configuration including the excavator 21, the bulldozer 22, and the crawler carrier 23. In another embodiment, the work machine 20 may include some of the excavator 21, the bulldozer 22, and the crawler carrier 23. In addition, the work machine 20 may include another type of work machine.

The embodiments described above are not limited to the configuration in which the position of the flight vehicle 8 is detected by using the global navigation satellite system (GNSS) and the attitude of the flight vehicle 8 is detected by using the inertial measurement unit. In another embodiment, the position and attitude of the flight vehicle 8 may be detected by using simultaneous localization and mapping (SLAM). Likewise, the positions and attitudes of the flight vehicle 11 and the work machines 20 may be detected by using SLAM.

REFERENCE SIGNS LIST

1 CONSTRUCTION MANAGEMENT SYSTEM
2 CONSTRUCTION SITE
3 MANAGEMENT DEVICE
3D THREE-DIMENSIONAL MODEL
4 SERVER (DATA PROCESSING DEVICE)
5 INFORMATION TERMINAL
6 CARRIER
7 CABLE
8 FLIGHT VEHICLE
8D THREE-DIMENSIONAL MODEL
9 DETECTION DEVICE
10 COMMUNICATION SYSTEM
11 FLIGHT VEHICLE
12 DETECTION DEVICE
13 REMOTE PLACE
14 POSITION SENSOR
15 ATTITUDE SENSOR
16 POSITION SENSOR
17 ATTITUDE SENSOR
20 WORK MACHINE

21 EXCAVATOR
21D THREE-DIMENSIONAL MODEL
22 BULLDOZER
23 CRAWLER CARRIER
23D THREE-DIMENSIONAL MODEL
24 CARRIAGE
25 SWING BODY
26 WORKING EQUIPMENT
26A BOOM
26B ARM
26C BUCKET
27 HYDRAULIC CYLINDER
27A BOOM CYLINDER
27B ARM CYLINDER
27C BUCKET CYLINDER
28 CARRIAGE
29 VEHICLE BODY
30 DUMP BODY
31 SYMBOL IMAGE
32 SYMBOL IMAGE
33 SYMBOL IMAGE
34 SYMBOL IMAGE
41 CURRENT TERRAIN DATA CREATION UNIT
42 DETECTION DATA ACQUISITION UNIT
43 RECOGNITION UNIT
44 REFLECTION UNIT
45 OUTPUT UNIT
46 SELECTION DATA ACQUISITION UNIT
47 REMOTE OPERATION PERMISSION UNIT
48 REMOTE OPERATION COMMAND UNIT
51 INPUT DEVICE
52 DISPLAY DEVICE
61 CURRENT TERRAIN STORAGE UNIT
62 WORK TYPE STORAGE UNIT
63 WORK TARGET STORAGE UNIT
64 THREE-DIMENSIONAL MODEL STORAGE UNIT
1000 COMPUTER SYSTEM
1001 PROCESSOR
1002 MAIN MEMORY
1003 STORAGE
1004 INTERFACE
WM PERSON

The invention claimed is:

1. A construction management system comprising a processor, wherein the processor:

causes a display device to display a plurality of remotely operable work machines, acquires machine selection data indicating specification of a work machine of the plurality of work machines, permits start of a remote operation of the work machine;

stores work types corresponding to each of the plurality of work machines and work targets corresponding to the work types, wherein the work machines displayed on the display device include an excavator and a dump truck, the stored work types are work types for each work machine including work types corresponding to the excavator and work types corresponding to the dump truck, the work types corresponding to the excavator are a plurality of work types including loading, and the work target corresponding to loading of the work types includes the dump truck, wherein when the machine selection data indicating that the excavator has been specified is acquired, the display device displays a plurality of work types corresponding to the excavator among the work types corresponding to each of the excavator and the dump truck stored in advance together with the plurality of work machines, and outputs the work target corresponding to the work type specified from the displayed plurality of work types to the display device on which the plurality of work machines are displayed;

acquires type selection data indicating a work type specified from the plurality of work types displayed on the display device, and target selection data indicating a work target specified from the displayed work targets; and permits start of the remote operation of the excavator based on the acquired type selection data and the target selection data.

2. The construction management system according to claim 1, wherein when the work type specified for the excavator is loading, the processor outputs text information of the dump truck as the work target corresponding to loading to the display device.

3. The construction management system according to claim 1, wherein the work types corresponding to the dump truck are a plurality of work types including leaving from a loading position, and the work target corresponding to leaving from the loading position of the work types includes a dumping position.

4. The construction management system according to claim 3, wherein when the machine selection data indicating that the dump truck has been specified is acquired, the specified work type is leaving from the loading position, and the work target is the dumping position, the processor does not permit start of the remote operation when an obstacle exists between the loading position and the dumping position.

5. The construction management system according to claim 1, wherein the processor creates current terrain data of a construction site on which the work machine operates;

acquires detection data from a detection device that detects the work machine and a construction area around the work machine;

generates reflection data in which the detection data is reflected in the current terrain data, wherein the detection data includes updated terrain data of the construction area, and the processor causes the display device to display the reflection data in which the updated terrain data is reflected, together with the work machine.

6. The construction management system according to claim 5, wherein the processor further recognizes the work machine based on the detection data, wherein the reflection data includes a three-dimensional model of the work machine recognized; and the processor causes the display device to display the three-dimensional model.

7. The construction management system according to claim 6, wherein the processor recognizes movement of the work machine; and moves the three-dimensional model in synchronization with the work machine.

8. The construction management system according to claim 5, wherein the detection device is mounted on a flight vehicle.

9. The construction management system according to claim 2, wherein after start of the remote operation of the excavator is permitted and before the remote operation of the excavator is completed, a dump truck selection data is acquired and start of the remote operation of the dump truck is permitted.

10. A data processing device comprising a processor, wherein the processor:

causes a display device to display a plurality of remotely operable work machines;

acquires machine selection data indicating specification of a work machine of the plurality of work machines;

permits start of a remote operation of the work machine;

stores work types corresponding to each of the plurality of work machines and work targets corresponding to the work types, wherein the work machines displayed on the display device include an excavator and a dump truck, the stored work types are work types for each work machine including work types corresponding to the excavator and work types corresponding to the dump truck, the work types corresponding to the excavator are a plurality of work types including loading, and the work target corresponding to loading of the work types includes the dump truck, wherein when the machine selection data indicating that the excavator has been specified is acquired, the display device displays a plurality of work types corresponding to the excavator among the work types corresponding to each of the excavator and the dump truck stored in advance together with the plurality of work machines, and outputs the work target corresponding to the work type specified from the displayed plurality of work types to the display device on which the plurality of work machines are displayed;

acquires type selection data indicating a work type specified from the plurality of work types displayed on the display device, and target selection data indicating a work target specified from the displayed work targets; and permits start of the remote operation of the excavator based on the acquired type selection data and the target selection data.

11. A construction management method comprising:

causing a display device to display a plurality of remotely operable work machines;

acquiring machine selection data indicating specification of a work machine of the plurality of work machines;

storing work types corresponding to each of the plurality of work machines and work targets corresponding to the work types, wherein the work machines displayed on the display device include an excavator and a dump truck, the stored work types are work types for each work machine including work types corresponding to the excavator and work types corresponding to the dump truck, the work types corresponding to the excavator are a plurality of work types including loading, and the work target corresponding to loading of the work types includes the dump truck, wherein when the machine selection data indicating that the excavator has been specified is acquired, the display device displays a plurality of work types corresponding to the excavator among the work types corresponding to each of the excavator and the dump truck stored in advance together with the plurality of work machines, and outputs the work target corresponding to the work type specified from the displayed plurality of work types to the display device on which the plurality of work machines are displayed, acquiring type selection data indicating a work type specified from the plurality of work types displayed on the display device, and target selection data indicating a work target specified from the displayed work targets; and permitting start of the remote operation of the excavator based on the acquired type selection data and the target selection data.

12. The construction management method according to claim 11, wherein when the work type specified for the excavator is loading, the method further comprises outputting text information of the dump truck as the work target corresponding to loading to the display device.

13. The construction management method according to claim 11, wherein the work types corresponding to the dump truck are a plurality of work types including leaving from a loading position, and the work target corresponding to leaving from the loading position of the work types includes a dumping position.

14. The construction management method according to claim 13, wherein when the machine selection data indicating that the dump truck has been specified is acquired, the specified work type is leaving from the loading position, and the work target is the dumping position, the method further comprises prohibiting start of the remote operation when an obstacle exists between the loading position and the dumping position.

* * * * *